(12) United States Patent
Iwakiri (10) Patent No.: US 8,801,820 B2
(45) Date of Patent: Aug. 12, 2014

(54) FILTER DEVICE, PAINTING BOOTH USING FILTER DEVICE, AND SIMPLIFIED PAINTING BOOTH USING FILTER DEVICE

(75) Inventor: Hiroshi Iwakiri, Tokyo (JP)

(73) Assignee: Taikisha Ltd., Tokyo (JP)

( * ) Notice: Subject to any disclaimer, the term of this patent is extended or adjusted under 35 U.S.C. 154(b) by 141 days.

(21) Appl. No.: 13/511,502

(22) PCT Filed: Sep. 22, 2010

(86) PCT No.: PCT/JP2010/066410
§ 371 (c)(1),
(2), (4) Date: May 23, 2012

(87) PCT Pub. No.: WO2011/121820
PCT Pub. Date: Oct. 6, 2011

(65) Prior Publication Data
US 2012/0266812 A1    Oct. 25, 2012

(30) Foreign Application Priority Data
Mar. 30, 2010    (JP) .................................. 2010-078318

(51) Int. Cl.
*B01D 46/00* (2006.01)
(52) U.S. Cl.
USPC ............. 55/385.2; 55/302; 55/324; 55/341.1; 55/418; 55/524; 55/DIG. 46; 118/326; 96/372
(58) Field of Classification Search
USPC ............ 55/385.2, 418, DIG. 46; 95/273, 278; 118/309, 326, 61; 427/300; 454/50, 53, 454/55, 187
See application file for complete search history.

(56) References Cited

U.S. PATENT DOCUMENTS

| | | | |
|---|---|---|---|
| 8,241,406 B2* | 8/2012 | Weschke | 95/278 |
| 8,535,420 B2* | 9/2013 | Holler et al. | 95/273 |
| 2008/0229925 A1 | 9/2008 | Wieland et al. | |
| 2009/0209188 A1 | 8/2009 | Wieland et al. | |
| 2010/0199912 A1* | 8/2010 | Holzheimer et al. | 118/326 |
| 2012/0266812 A1* | 10/2012 | Iwakiri | 118/326 |

FOREIGN PATENT DOCUMENTS

| | | |
|---|---|---|
| JP | 50139138 | 11/1975 |
| JP | 53109274 | 9/1978 |
| JP | 62109765 U | 7/1987 |
| JP | 737311 U | 7/1995 |
| JP | 09108518 A | 4/1997 |
| JP | 11128642 A | 5/1999 |
| JP | 2002336749 A | 11/2002 |
| JP | 2008536661 A | 9/2008 |
| JP | 2009509760 A | 3/2009 |

* cited by examiner

*Primary Examiner* — Duane Smith
*Assistant Examiner* — Minh-Chau Pham
(74) *Attorney, Agent, or Firm* — The Webb Law Firm

(57) ABSTRACT

Distribution of a precoat agent is made uniform in a target gas directing to a filter. To this end, an intake opening of a filter device is formed as a slit-like or rectangular opening extending in a width direction. An accumulation recess is formed in an upper edge portion of the intake opening to have a profile that opens downward as viewed from a longitudinal direction of the intake opening. The accumulation recess is continuously formed in the longitudinal direction of the intake opening. A precoat agent nozzle is provided in a longitudinal predetermined position of the intake opening for ejecting the precoat agent and carrier gas toward an inner depth surface of the accumulation recess.

14 Claims, 7 Drawing Sheets

FILTER DEVICE, PAINTING BOOTH USING FILTER DEVICE, AND SIMPLIFIED PAINTING BOOTH USING FILTER DEVICE

TECHNICAL FILED

The present invention relates to a filter device, a painting booth using the filter device, and a simplified painting booth using the filter device.

The filter device includes a filter housed in a device casing, and an intake opening provided in the device casing for a target gas containing a viscous matter to be captured such as paint mist and oil mist.

A precoat agent nozzle is provided in the intake opening for ejecting a powder-type precoat agent for the filter along with carrier gas to the target gas flowing into the device casing from the intake opening.

BACKGROUND ART

In such a filter device, the precoat agent nozzle is arranged in the intake opening in order to reliably mix the precoat agent with the target gas flowing into the device casing through the intake opening.

In a conventional filter device as shown in FIG. 1 of Patent Document 1, a simple circular or rectangular opening acting as the intake opening is formed in a plate member forming the device casing, and the precoat agent nozzle is arranged in such an opening to be directed to the interior of the device casing (Prior Art 1).

In another conventional filter device shown in FIGS. 1 and 2 of Patent Document 2, the precoat agent nozzle is provided in the vicinity of the intake opening in the interior of the device casing (Prior Art 2).

On the other hand, an example of the painting booth for catching the paint mist contained in exhaust air discharged from a painting chamber by the filter is shown in FIGS. 1 and 15 of Patent Document 3.

In the painting booth as shown in FIG. 1 of Patent Document 3 (see FIG. 7 of the present application), an exhaust chamber 4 is provided under the painting chamber 2 for receiving the exhaust air EA from the painting chamber 2.

Figure 7:
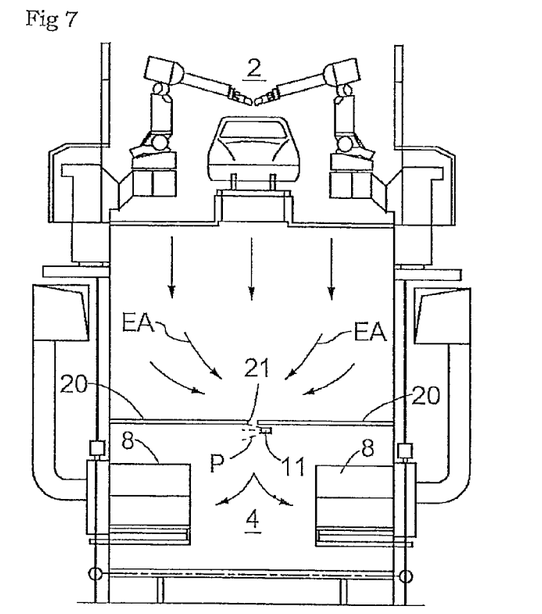
FIG. 7 is a sectional view of a conventional painting booth.

A pair of guide plates 20 is provided for partitioning the exhaust chamber 4 into an upper region and a lower region, and a central slit-like gap 21 is formed between tip end edges of the pair of guide plates 20.

The central slit-like gap 21 extends in a longitudinal direction of the booth (that is, a direction of transporting a target object in the painting chamber 2).

The lower region formed by partitioning the exhaust chamber 4 by the guide plates 20 acts as a filtering chamber including a plurality of filters arranged therein. The plurality of filters are arranged in the longitudinal direction of the booth.

The precoat agent nozzle 11 is provided in a back side surface of one of the guide plates 20 in the vicinity of the central slit-like gap 21 for ejecting the precoat agent P toward the exhaust air EA passing through the central slit-like gap 21 (Prior Art 3).

In the painting booth shown in FIG. 15 of Patent Document 3 (see FIG. 8 of the present application), vertical plates 22 surrounding the filters 8 together with the guide plates 20 are suspended from the end portions of the guide plates 20. A bottom slit-like gap 23 is formed between a lower edge of each vertical plate 22 and the bottom of the exhaust chamber 4. The bottom slit-like gap 23 also extends in the longitudinal direction of the booth.

Figure 8:
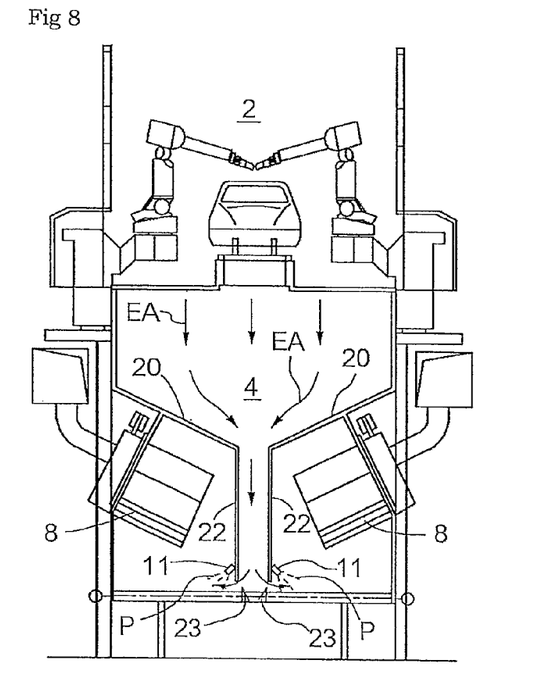
FIG. 8 is a sectional view of another conventional painting booth.

The precoat agent nozzle 11 is provided in a back side surface of each vertical plate 22 in the vicinity of the bottom slit-like gap 23 for ejecting the precoat agent P toward the exhaust air EA passing through the bottom slit-like gap 23 (Prior Art 4).

More particularly, in those painting booths, the precoat agent P is ejected toward a high-speed flow of the exhaust air EA passing through the central slit-like gap 21 or bottom slit-like gap 23.

This allows the precoat agent P to mix with the exhaust air EA uniformly with agitation caused by the high-speed flow of the exhaust air EA, and then allows the exhaust air EA to pass through the filters 8.

PRIOR ART DOCUMENT

[Patent Document 1] Japanese Unexamined Patent Application Publication No. 53-109274
[Patent Document 2] Japanese Utility Model Publication No. 7-37311
[Patent Document 3] Japanese Unexamined Patent Application National Publication No. 2008-536661
[Patent Document 4] Japanese Unexamined Patent Application Publication No. 2002-336749
[Patent Document 5] Japanese Utility Model Publication No. 62-109765

SUMMARY OF INVENTION

Technical Problem

It is typically often required in the filter device that the intake opening for the filter device have a rectangular shape or a slit-like shape extending in a width direction.

This is for passing the target gas flowing from the intake opening through the filter provided in the filter device uniformly.

Otherwise, this is for allowing the exhaust air from the painting booth to flow into the filter device uniformly and smoothly over the entire width of the painting chamber as seen from the filter device attached to the painting booth of Patent Document 4 and the filter device (demister device) attached to the simplified painting booth of Patent Document 5.

In the above-noted case, however, the following problems have arisen with the arrangement in which the precoat agent nozzle is simply provided in the opening acting as the intake opening as disclosed in Prior Art 1 (see FIG. 1 of Patent Document 1) or the arrangement in which the precoat agent nozzle is simply provided in the vicinity of the intake opening in the interior of the device casing as disclosed in Prior Art 2 (FIGS. 1 and 2 of Patent Document 2).

That is, in such arrangements, the precoat agent ejected from the precoat agent nozzle is not uniformly distributed in the width direction of the intake opening toward the target gas flowing from the intake opening extending in the width direction. This causes uneven distribution of the precoat agent in the target gas to pass through the filters, which results in poor formation of a precoat layer in the filter.

In order to prevent such uneven distribution of the precoat agent, it is required to arrange numerous precoat agent nozzles in the width direction (longitudinal direction) of the intake opening at as small intervals as possible. This results in a complicated device and increased manufacturing cost.

On the other hand, the similar problems have been produced with the painting booths disclosed in Prior Art 3 and Prior Art 4 (see FIGS. 1 and 15 of Patent Document 3; in particular, substantially corresponding to the above-noted problems in the filter device with respect to Prior Art 4).

More particularly, in order to mix the precoat agent P ejected from the precoat agent nozzle 11 uniformly in the longitudinal direction of the booth with the exhaust air EA passing through the central slit-like gap 21 or the bottom slit-like gap 23 extending in the longitudinal direction of the booth, it is required to arrange numerous precoat agent nozzles in the longitudinal direction of the booth at as small intervals as possible. This also results in a complicated device and increased manufacturing cost.

Under the circumstances, the subject matter of the present invention is to solve the above-noted problems by employing a rational agitating/mixing system for the precoat agent ejected from the precoat agent nozzle.

Solution to Problem

A first characteristic feature of the present invention lies in a filter device comprising: a device casing; a filter housed in the device casing; an intake opening provided in the device casing for taking in a target gas containing a viscous matter to be captured; and a precoat agent nozzle provided in the intake opening for ejecting a powder-type precoat agent for the filter along with carrier gas toward the target gas that flows into the device casing from the intake opening, wherein the intake opening is a slit-like or rectangular opening extending in a width direction and provided in a side face portion of the device casing, wherein an accumulation recess provided in an upper edge portion of the intake opening and continuously formed in a longitudinal direction of the intake opening, the accumulation recess having a profile that opens downward as viewed from the longitudinal direction of the intake opening; and wherein the precoat agent nozzle is arranged in a predetermined position of the intake opening in the longitudinal direction thereof for ejecting the precoat agent and carrier gas toward an inner depth surface of the accumulation recess.

With the above-noted arrangement, the powder-type precoat agent is ejected along with carrier gas toward the inner depth surface of the accumulation recess, which can produce whirl-like accumulation of the ejected carrier gas accompanied by the precoat agent in the accumulation recess over an appropriate period of time in cooperation with the flow of the target gas in the intake opening passing through the vicinity of the opening surface of the downward opening of the accumulation recess.

Such whirl-like accumulation allows the precoat agent to disperse, accompanied by agitation, in the longitudinal direction (width direction) of the intake opening from the position where the precoat agent nozzle is provided in the accumulation recess continuously formed in the longitudinal direction of the intake opening.

In this way, the precoat agent is allowed to disperse in the longitudinal direction of the intake opening and allows the dispersed precoat agent to be gradually taken into the passing flow of the target gas in the intake opening from the downward opening of the accumulation recess, as a result of which the precoat agent can be mixed with the target gas.

This allows the precoat agent to mix with the target gas flowing into the device casing from the intake opening in a uniform distribution condition in the longitudinal direction of the intake opening.

Further, it is prevented that a number of precoat agent nozzles are arranged at small intervals in the width direction (longitudinal direction) of the intake opening, while the intake opening can be a slit-like opening or rectangular opening extending in the width direction according to various demands.

More particularly, only one precoat agent nozzle provided in the intake opening will suffice, or, even if the plurality of precoat agent nozzles would be arranged in the width direction of the intake opening, the number of nozzles can be effectively reduced by securing large intervals between the nozzles.

It should be noted that various shapes such as an arc shape or polygonal shape can be employed as a specific profile of the accumulation recess as viewed from the longitudinal direction of the intake opening, and can be selected depending on the flowing speed of the target gas or the material of the precoat agent, for example.

A second characteristic feature of the present invention specifies a preferred embodiment for achieving the first characteristic feature.

The second characteristic feature of the present invention lies in that the accumulation recess defines an upstream edge portion in a direction of passage of the target gas as a vertical upstream suspended wall.

With the above-noted arrangement, the precoat agent and carrier gas in the dispersed condition having reached the upstream edge of the accumulation recess in the direction of passage of the target gas in the whirl-like accumulation in the accumulation recess can be guided downward by the vertical upstream suspended wall.

Then, the downward guide by the upstream suspended wall allows the precoat agent to positively join the passing flow of the target gas in the upstream portion of the intake opening.

As a result, the precoat agent can be effectively dispersed in the height direction (short-side direction) of the intake opening and mixed with the target gas, thereby to achieve the more uniform distribution of the precoat agent in the target gas to pass through the filters.

A third characteristic feature of the present invention specifies a preferred embodiment for achieving the first or second characteristic feature, and lies in that the accumulation recess defines a downstream edge portion in a direction of passage of the target gas as a vertical downstream suspended wall.

With the above-noted arrangement, in the similar manner to the upstream suspended wall noted above, the precoat agent and carrier gas in the dispersed condition having reached the downstream edge of the accumulation recess in the direction of passage of the target gas in the whirl-like accumulation in the accumulation recess can be guided downward by the vertical downstream suspended wall.

Then, the downward guide by the downstream suspended wall allows the precoat agent to positively join the passing flow of the target gas in the downstream portion of the intake opening.

As a result, the precoat agent can be effectively dispersed in the height direction (short-side direction) of the intake opening and mixed with the target gas, thereby to achieve the more uniform distribution of the precoat agent in the target gas passing through the filter.

When a bottom portion opposing to the accumulation recess is continuously formed at a lower edge portion of the intake opening in the longitudinal direction of the intake opening in the arrangement according to the second or third characteristic feature, the following effects can be achieved as well.

That is, the downward flow produced by the guidance by the upstream suspended wall or downstream suspended wall allows an appropriate amount of the precoat agent mixed with the passing flow of the target gas in the intake opening to reliably reach the above-noted bottom portion of the intake opening, which can form the precoat layer on the bottom portion.

As a result, it is effectively prevented by the precoat layer in the bottom portion that the viscous matter to be captured contained in the target gas is attached to or accumulated on the bottom portion of the intake opening.

In particular, when a slanting bottom as described below is provided to descend toward the downstream side in the direction of passage of the target gas, the following effects can be achieved as well.

That is, the downward flow produced by the guidance of the downstream suspended wall allows part of the precoat agent to reach the downstream portion of the slanting bottom, and a reversing current component (that is, a current component ascending the slanting bottom) to the upstream side along the slanting bottom allows the precoat agent having reached the downstream portion of the slanting wall to be kept in a spread condition in the slanting bottom.

This can provide the slanting bottom in the intake opening, and yet stably maintain the precoat agent layer in the slanting bottom for preventing attachment of the viscous matter to the slanting bottom.

A fourth characteristic feature of the present invention specifies a preferred embodiment for achieving one of the first to third characteristic features, and lies in that the precoat agent nozzle has a jet central axis that obliquely intersects the inner depth surface of the accumulation recess.

With the above-noted arrangement, it is prevented by dissipation of colliding energy produced by the oblique intersection that the precoat agent ejected along with carrier gas from the precoat agent nozzle is attached to or accumulated on the inner depth surface of the accumulation recess.

This can stably and satisfactorily maintain the dispersion of the precoat agent in the accumulation recess when the humidity of the target gas is high or the coagulability of the precoat agent is high.

Further, in this arrangement, the whirl-like accumulation of the precoat and carrier gas ejected from the precoat agent nozzle in the accumulation recess can be promoted by the guidance of the inner depth surface obliquely intersecting the jet central axis of the precoat agent nozzle.

This can further promote the dispersion of the precoat agent in the accumulation recess in the longitudinal direction of the intake opening.

In implementing the above, the following arrangements can be employed in order for the jet central axis of the precoat agent nozzle to obliquely intersect the inner depth surface of the accumulation recess.

That is, any one of the arrangements, namely, the arrangement in which the jet central axis of the precoat agent nozzle is inclined relative to the perpendicular direction, the arrangement in which the inner depth surface of the accumulation recess is inclined relative to the horizontal direction, and the arrangement in which the jet central axis of the precoat agent nozzle is inclined relative to the perpendicular direction and the inner depth surface of the accumulation recess is inclined relative to the horizontal direction can be employed.

A fifth characteristic feature of the present invention specifies a preferred embodiment for achieving one of the first to fourth characteristic features, and lies in that the precoat agent nozzle has a jet opening positioned in the downstream side in reference to the central portion of the accumulation recess in the direction of passage of the target gas in the intake opening.

With this arrangement, the whirl-like accumulation area produced by the precoat agent and carrier gas ejected from the precoat agent nozzle in the accumulation recess can be formed more largely in the upstream portion (that is, the portion between the upstream edge of the accumulation recess and the precoat agent nozzle) than in the downstream portion in the direction of passage of the target gas in the accumulation recess.

This allows the area where the precoat agent is mixed with the target gas passing through the intake opening to be localized in the upstream side of the accumulation recess in the direction of passage of the target gas.

More particularly, the dispersion of the precoat agent can be promoted by the localization in the target gas in the process of passing through the intake opening, which further provides the more uniform distribution of the precoat agent in the target gas.

A sixth characteristic feature of the present invention lies in that a slanting bottom is formed at a lower edge portion of the intake opening to oppose to the accumulation recess and descend toward the downstream side in the direction of passage of the target gas in the intake opening, the slanting bottom being continuously formed in the longitudinal direction of the intake opening.

With the above-noted arrangement, even if the viscous matter to be captured contained in the target gas is accumulated on the slanting bottom in a mixed condition with the precoat agent, such an accumulated matter in the mixed condition can be quickly removed inward of the device casing owing to the inclination of the slanting wall, and in cooperation with the attachment preventing effect achieved by the precoat layer if the precoat layer is present on the bottom portion as noted above.

This can satisfactorily and stably maintain the operation of the filter device.

A seventh characteristic feature of the present invention specifies a preferred embodiment for achieving the sixth characteristic feature, and lies in that the downstream edge portion of the accumulation recess is arranged in a position lower than the upstream edge portion in the direction of passage of the target gas to allow a downstream opening formed between the downstream edge portion of the accumulation recess and an underlying downstream edge portion of the slanting bottom to be arranged in a position lower than an upstream opening formed between the upstream edge portion of the accumulation recess and the underlying upstream edge portion of the slanting bottom, and wherein the filter is arranged in a position higher than the downstream opening in the interior of the device casing.

With the above-noted arrangement, the target gas is allowed to pass obliquely downward from the upstream opening at the higher position to the downstream opening at the lower position in the intake opening, and then the direction of the target gas flow is drastically changed from the downward direction to the upward direction. Thus, the target gas is capable of passing through the filters positioned higher than the downstream opening in the intake opening.

More particularly, such drastic change of the direction promotes the dispersion of the precoat agent in the target gas, the precoat agent being mixed with the target gas in passing through the intake opening, thereby to achieve the more uniform distribution of the precoat agent in the target gas to pass through the filters.

An eighth characteristic feature of the present invention specifies a preferred embodiment for achieving the sixth or seventh characteristic feature, and lies in that the slanting bottom has an upstream edge portion acting as a vertical upstream upright wall extending upright toward the upstream edge portion of the accumulation recess in the direction of passage of the target gas in the intake opening.

At the upper edge of the intake opening, the passing speed of the target gas is suppressed by the presence of the accumulation recess (in particular, the presence of the upstream edge portion of the accumulation recess).

According to the above-noted arrangement, the presence of the upstream upright wall extending upright toward the upstream edge portion of the accumulation recess can suppress the passing speed of the target gas even at the lower edge side of the intake opening (that is, the side of the slanting bottom).

As a result, the passing speed of the target gas in the intake opening can be balanced, which can maintain smoothly and stably the flow of the target gas into the device casing through the intake opening and the mixture of the precoat agent and the target gas in the intake opening.

A ninth characteristic feature of the present invention specifies a preferred embodiment for achieving one of the first to eighth characteristic features, and lies in that the filter is arranged in a position higher than the intake opening in the interior of the device casing, and wherein a carrying-out device is provided in a position lower than the intake opening under the filter for transporting a mixture released and fallen from the filter in the longitudinal direction of the intake opening and discharging them to the outside of the device casing.

In the filter device of this type, when the accumulated layer of the captured matter including the mixture of the viscous captured matter present in the target gas and the precoat agent is formed on the catching surface of the filter and grows to some extent, the mixture forming the accumulated layer of captured matter is released from the filter by any suitable means to reproduce the filter.

According to the above-noted arrangement, the carrying-out device can transport the mixture released and fallen in reproducing the filter or the mixture released and fallen by itself from the filter during the normal operation to the outside of the device casing.

Further, with the above-noted arrangement, the carrying-out device is also capable of transporting the mixture produced by binding of the viscous captured matter and the precoat agent in the process of reaching the filter after having passed through the intake opening or the precoat agent fallen in the process of reaching the filter to the outside of the device casing. This facilitates maintenance of the filter device.

A tenth characteristic feature of the present invention specifies a preferred embodiment for achieving the ninth characteristic feature, and lies in that a raising prevention guide plate is provided to horizontally project from a lower edge portion of the intake opening toward the carry-out device.

With the above-noted arrangement, the raising prevention guide plate is configured to guide the current of the target gas having passed through the intake opening, thereby to preventing the current of the target gas from affecting the carrying-out device and to change the direction of the target gas flow upward to direct the target gas to the filters with the influences on the carrying-out device being avoided.

More particularly, the lightweight powder components contained in the fallen mixture to be transported by the carrying-out device under the filters are prevented from being raised by the target gas having passed through the intake opening.

Thus, the viscous matter to be captured present in the target gas can be captured by the filters with a suitable mixed condition in which only the fresh precoat agent supplied from the precoat agent nozzle is mixed with the target gas. Further, the fallen mixture can be transported by the carrying-out device reliably and satisfactorily.

A eleventh characteristic feature of the present invention relates to a painting booth using the filter device according to one of the first to tenth characteristic features, and lies in comprising an exhaust chamber provided under a painting chamber for painting a target object, the exhaust chamber being configured to receive exhaust air containing paint mist discharged downward from the painting chamber, wherein a plurality of the filter devices are arranged in a longitudinal direction of the booth with the intake openings of each of the filter devices being arranged in line in the longitudinal direction of the booth and open toward the interior of the exhaust chamber.

With the above-noted arrangement, a high flow of the exhaust air flowing into the exhaust chamber from the painting chamber can stably reach the intake openings of each filter device in a uniform air current condition in the longitudinal direction of the booth due to the air intake by the intake openings arranged in line in the longitudinal direction of the booth, and can flow into each of the filter devices arranged in the longitudinal direction of the booth as the target gas in a balanced manner.

As a result, it is possible to smoothly and effectively catch the paint mist by the filter devices as the matter to be captured present in the high flow of the exhaust air from the painting chamber.

In the intake opening of each filter device, as noted above, the precoat agent ejected from the precoat agent nozzle can be effectively distributed in the longitudinal direction of the intake opening (that is, the longitudinal direction of the booth) and mixed with the target gas (that is, the exhaust air) passing through the intake opening owing to the accumulation recess formed at the upper edge portion of the intake opening.

As a result, the required number of the precoat agent nozzles can be drastically reduced compared with the painting booth disclosed in Prior Art 3 or 4 (see FIGS. 1 and 15 of Patent Document 3) in which numeral precoat agent nozzles are required to be arranged in the longitudinal direction of the booth at small intervals in the central slit-like gap or the bottom slit-lie gap extending in the longitudinal direction of the booth as noted above.

Therefore, it is possible to simplify the structure of the painting booth as a whole including the filter device, reduce the manufacturing cost of the painting booth, and facilitates the maintenance.

A twelfth characteristic feature of the present invention specifies a preferred embodiment for achieving the eleventh characteristic feature, and lies in that the intake openings are arranged in line in the longitudinal direction of the booth at a bottom portion of the exhaust chamber.

With the above-noted arrangement, the intake openings arranged in line are provided in the bottom portion of the exhaust chamber, thereby to guide the high flow of the exhaust air entering the exhaust chamber downward from the painting chamber in the horizontal direction by the bottom wall of the exhaust camber and then smoothly guide it to the intake openings of each filter device.

As a result, the high flow of the exhaust air from the painting chamber can be treated by the filter device more smoothly and effectively in cooperation with the effect that the exhaust air from the painting chamber is stably directed to the intake opening of each filter device in the uniform current condition in the longitudinal direction of the booth.

A thirteenth characteristic feature of the present invention specifies a preferred embodiment for achieving the eleventh or twelfth characteristic feature, and lies in that the filter devices are arranged in the longitudinal direction of the booth adjacent to the exhaust chamber, and the intake opening of each of the filter devices is formed in a side wall of the exhaust chamber.

With the above-noted arrangement, the inspection and maintenance of the respective filter devices arranged in the longitudinal direction of the booth can be easily performed from the outside of the painting booth compared with the arrangement in which the filter devices are provided in the interior of the exhaust chamber with the intake openings of the filter devices being opened toward the exhaust chamber, for example.

In addition, the intake openings are directly formed in the side wall of the exhaust chamber and thus the maintenance of a connecting duct is dispensable, which can provide a painting booth having the good maintenance properties, unlike the arrangement in which the filter device is provided in a position remote from the painting booth to allow the intake opening of the filter device to communicate with the exhaust chamber through the elongated connecting duct.

It should be noted that, in this embodiment, various arrangements of the filter device can be employed, that is, the arrangement in which each filter device is provided adjacent to the exhaust chamber having substantially the same width as the painting chamber, or the arrangement in which each filter device is provided adjacent to the exhaust chamber having a smaller width than the painting chamber to fit into a dented portion formed laterally and outwardly of the exhaust chamber as viewed from the longitudinal direction of the booth under the painting chamber, for example.

A fourteenth characteristic feature of the present invention relates to a simplified painting booth using the filter device according to one of the first to tenth characteristic features, and lies in that the filter device is arranged adjacent to the painting chamber for spraying the target object, and the intake opening of the filter device is formed in a side wall of the painting chamber at a bottom portion of the painting chamber.

With the above-noted arrangement, the air containing floating paint mist resulting from excessive spray of paint in the painting chamber is allowed to flow into the filter device as the target gas through the intake opening formed in the side wall of the bottom portion of the painting chamber.

As a result, the paint mist as the matter to be captured present in the air (that is, the exhaust air) can be caught smoothly and effectively by the filter device.

Further, as noted above, in the intake opening of the filter device, the precoat agent ejected from the precoat agent nozzle can be effectively distributed in the longitudinal direction of the intake opening and mixed with the target gas (that is, the exhaust air) passing through the intake opening owing to the accumulation recess formed at the upper edge portion of the intake opening. This can drastically reduce the required number of precoat agent nozzles.

Therefore, it is possible to reduce the manufacturing cost for the simplified painting booth as a whole including the filter device while requiring the precoat agent nozzle, and facilitate the maintenance.

In addition, the filter device is provided adjacent to the painting chamber and the intake opening of the filter device is directly formed in the side wall of the painting chamber, which can maintain the original compactness of the simplified painting booth.

MODE FOR CARRYING OUT INVENTION

[First Embodiment]

Figure 1:
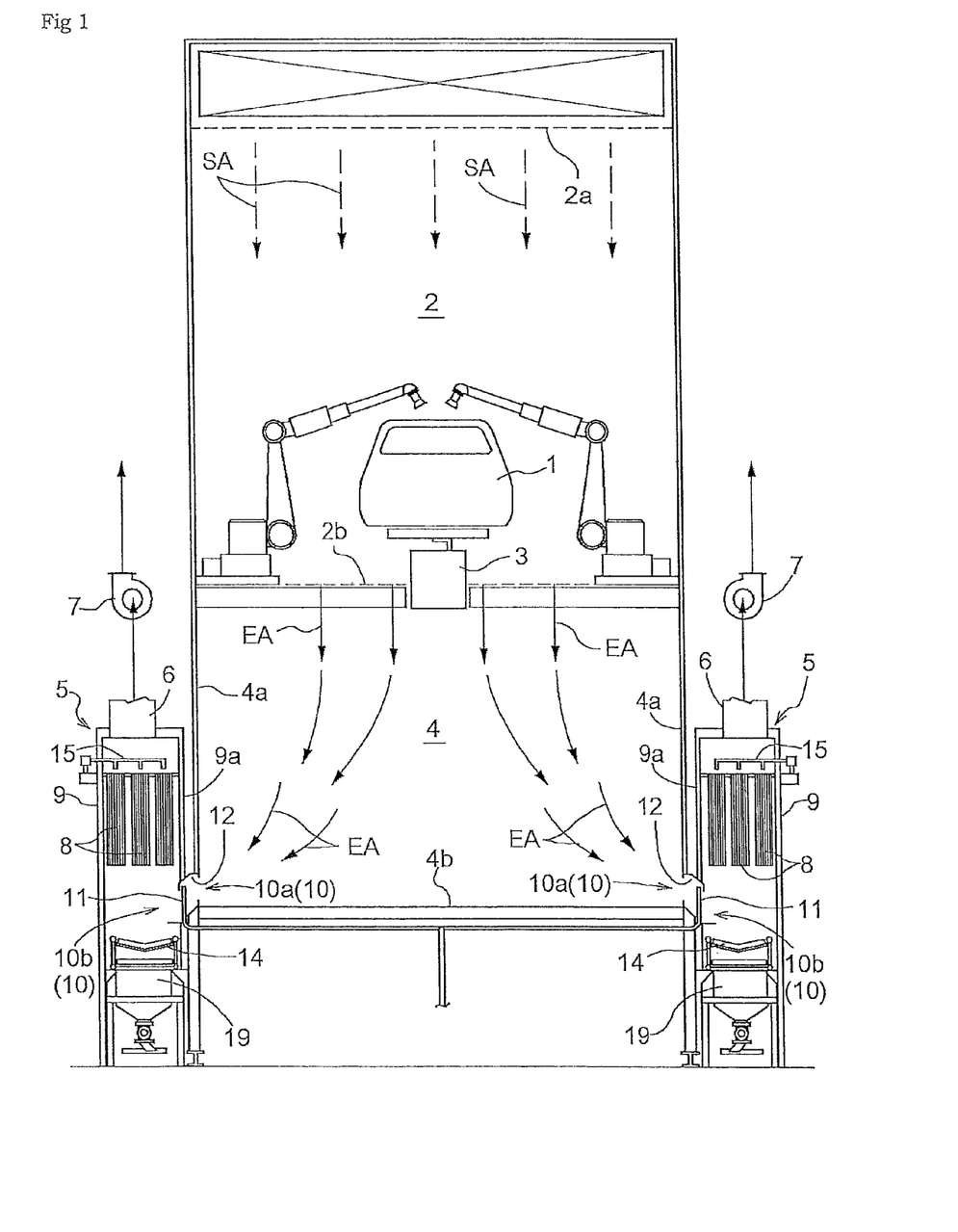
FIG. 1 is a sectional view of a painting booth according to a first embodiment.
Figure 2:
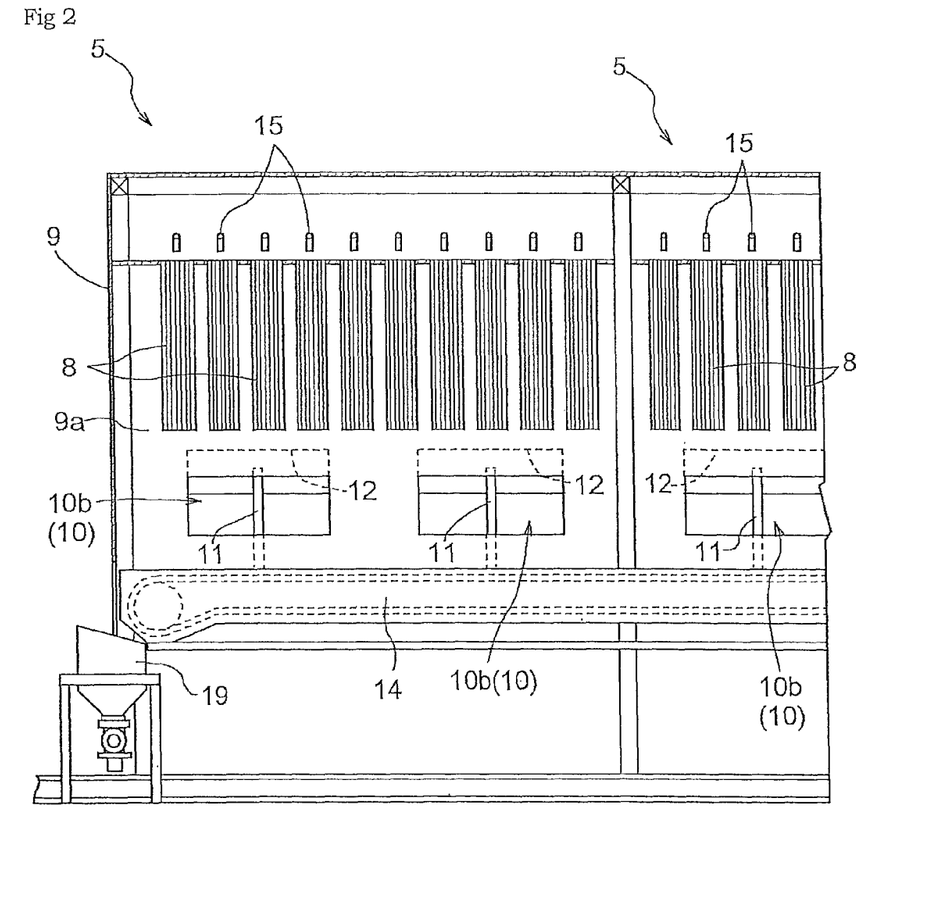
FIG. 2 is a sectional side view of the painting booth shown in FIG. 1.

FIGS. 1 and 2 show a painting booth, respectively, including a painting chamber 2 for painting a target object (automobile body in the present invention) 1 using a painting gun and a transporting device 3 provided in the painting chamber 2 for transporting the target object 1.

The painting chamber 2 is formed as a tunnel-like room extending in a direction of transporting the target object 1 (depth direction in FIG. 1). Ventilation air SA whose temperature and humidity are regulated for the entire tunnel-like room is supplied from a ceiling 2a.

An exhaust chamber 4 is formed under the painting chamber 2 to extend in the direction of transporting the target object 1 in the same manner as the painting chamber 2 for receiving exhaust air EA discharged downward from the painting chamber 2 through a grid floor 2b in the wake of supply of the ventilation air SA to the painting chamber 2.

The exhaust air EA contains floating paint mist resulting from excessive spray of paint in the painting chamber 2, which is discharged to the underlying exhaust chamber 4 in a piston manner in the wake of the supply of the ventilation air SA from the ceiling 2a of the painting chamber 2. This removes the floating paint mist produced in the painting chamber 2 from the painting chamber 2 quickly and reliably to maintain the high painting quality of the target object 1 and keep a good working environment in the painting chamber 2.

At opposite lateral sides of the exhaust chamber 4 having substantially the same width as the painting chamber 2 are arranged filter devices 5 in a longitudinal direction of the painting booth that is coincide with the direction of transporting the target object 1. The exhaust air EA flowing into the exhaust chamber 4 from the painting chamber 2 is allowed to subsequently pass through each of the filter devices 5 thereby to catch the paint mist contained in the exhaust air EA through the filter device 5 to purify the exhaust air EA.

The exhaust air EA purified at each filter device 5 is discharged to the outside from an exhaust fan 7 through an exhaust duct 6 connected to an upper portion of each filter device 5 (or returned to the painting chamber 2 as the ventilation air SA through an air conditioner).

Each filter device 5 includes a device casing 9 for housing a plurality of bug filters 8 arranged in line in a suspended manner. Two slit-like or rectangular (collectively referred to as "slit-like" hereinafter) intake openings 10 extending in a width direction are formed in a lower portion of a side wall 9a of the device casing 9 under the bug filters 8. Those two intake openings 10 are serially arranged in the width direction thereof.

More particularly, the exhaust air EA as a target gas is allowed to flow into the device casing 9 from the exhaust chamber 4 through the slit-like intake openings 10 to pass through the bug filters 8 by a drawing force provided by the exhaust fan 7 through the exhaust duct 6 connected to the upper end portion of the device casing 9, thereby to capture the paint mist to be caught present in the exhaust air EA through the bug filters 8.

Further, since the paint mist to be caught has viscosity, each filter device 5 is provided with a precoat agent nozzle 11 in each of the intake openings 10, through which a powder-type precoat agent P is mixed with the exhaust air EA passing through the intake openings 10.

More particularly, the exhaust air EA mixed with the powder-type precoat agent P is allowed to pass through the bug filters 8, thereby to form a precoat layer on a catching surface of each bug filter 8 to catch the paint mist present in the exhaust air EA. The precoat layer specifically represents an accumulated layer of the precoat agent P dispersedly mixed with the paint mist present in the exhaust air EA.

The filter devices 5 are arranged adjacent to the opposite lateral sides of the exhaust chamber 4 in the longitudinal direction of the booth. The slit-like intake openings 10 in each filter device 5 are arranged in line in the longitudinal direction of the booth in a lower end portion of each of opposite side walls 4a of the exhaust chamber 4 to open toward the exhaust chamber 4 at a bottom portion of the exhaust chamber 4.

In this arrangement, the flow of the exhaust air EA flowing downward into the exhaust chamber 4 from the painting chamber 2 is divided into two streams in the width direction of the booth as shown in arrow in the drawings, each of which streams of the exhaust air EA is maintained in a uniform air current in the longitudinal direction of the booth and smoothly guided transversely and outwardly at the bottom of the exhaust chamber 4 by a bottom wall 4b of the exhaust chamber 4. As a result, the two streams of the exhaust air EA are drawn into the slit-like intake openings 10 of the respective filter devices in a balanced manner.

Figure 3:
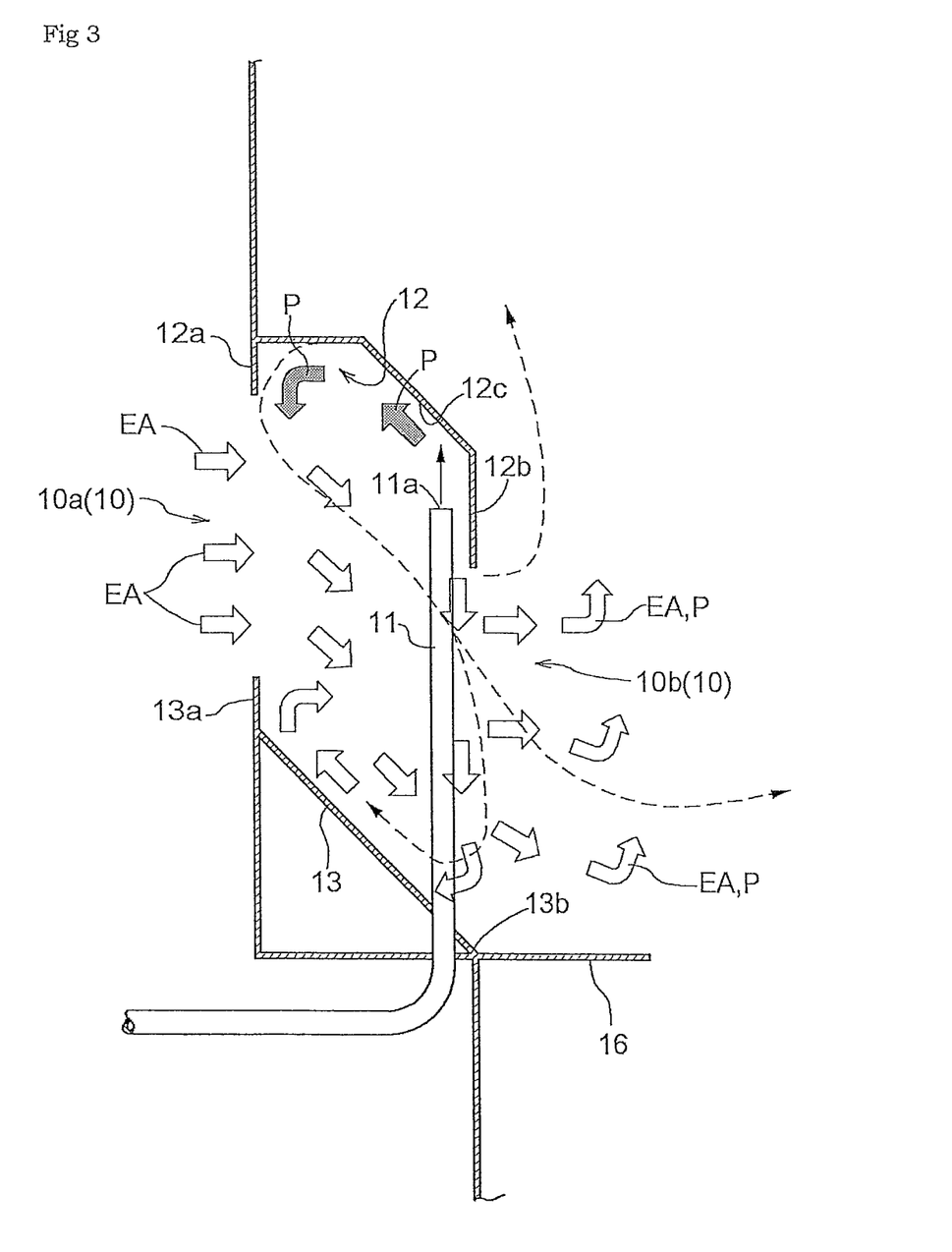
FIG. 3 is an enlarged view of a principal portion.

As shown in FIG. 3, at an upper edge portion of each intake opening 10 in each of the filter devices 5 is formed an accumulation recess 12 having a section opened downward as viewed from the longitudinal direction of the intake opening 10. The accumulation recess 12 is continuously formed in the longitudinal direction (width direction) of the intake opening 10.

In a direction of passage of the exhaust air EA in each intake opening 10, the accumulation recess 12 has an upstream edge portion acting as a vertical upstream suspended wall 12a continued from the side wall 4a of the exhaust chamber 4, and a downstream edge portion acting as a vertical downstream suspended wall 12b substantially continued from the side wall 9a of the device casing 9.

On the other hand, a slanting bottom 13 is formed at a lower edge portion of the intake opening 10 to oppose to the accumulation recess 12 at the upper edge portion and descend toward the downstream side in the direction of passage of the exhaust air EA in the intake opening 10. The slanting bottom 13 is also continuously formed in the longitudinal direction (width direction) of the intake opening 10.

In the direction of passage of the exhaust air EA in each intake opening 10, the slanting bottom 13 has an upstream edge portion acting as a vertical upstream upright wall 13a extending upright toward the upstream edge portion 12a of the accumulation recess 12.

The downstream suspended wall 12b representing the downstream edge portion of the accumulation recess 12 is arranged in a position lower than the upstream suspended wall 12a representing the upstream edge portion of the accumulation recess 12 so that a downstream opening 10b formed between the downstream edge portion 12b of the accumulation recess 12 and an underlying downstream edge portion 13b of the slanting bottom 13 is arranged in a position lower than an upstream opening 10a formed between the upstream edge portion 12a of the accumulation recess 12 and the underlying upstream edge portion 13a of the slanting bottom 13.

A precoat agent nozzle 11 for ejecting the precoat agent P along with compressed air is arranged to spray the precoat agent P and compressed air acting as carrier gas on an inner depth surface of the accumulation recess 12 at a longitudinal central portion of each intake opening 10.

More particularly, the powder-type precoat agent P is ejected along with the compressed air toward the inner depth surface of the accumulation recess 12 in this way, as a result of which whirl-like accumulation of air flow entraining the precoat agent P is produced in the accumulation recess 12 over an appropriate period of time as shown in blotted arrow in the drawings.

This allows the precoat agent P to disperse in the longitudinal direction (width direction) of the intake opening 10 in the accumulation recess 12 continuously formed in the longitudinal direction of the intake opening 10 with agitation by the whirl-like accumulation of air flow. Then, the dispersed precoat agent P is taken into a passage flow of the exhaust air EA in the intake opening 10 little by little to allow the precoat agent P to mix with the exhaust air EA in a uniformly dispersed manner in the longitudinal direction of the intake opening 10.

Further, the flowing speed of the exhaust air EA is made uniform in the vertical direction of the intake opening 10 as well by the upstream suspended wall 12a of the accumulation recess 12 and the upstream upright wall 13a of the slanting bottom 13, in which the precoat agent P dispersed in the accumulation recess 12 is guided downward by the upstream suspended wall 12a and the downstream suspended wall 12b, respectively.

This also effectively distributes the precoat agent P in a height direction (in the direction of shorter side) of the intake opening 10.

Also, the downward flow produced by the guidance of the downstream suspended wall 12b reaches the slanting bottom 13 to create a reversing current component to the upstream side along the slanting bottom 13, thereby to keep part of the precoat agent P in a spread state in the slanting bottom 13 to stably maintain the precoat agent layer in the slanting bottom 13 for preventing attachment of the paint mist to the slanting bottom 13.

Further, owing to the arrangement of the downstream opening 10b of the intake opening 10 positioned lower than the upstream opening 10a, the direction of the exhaust air EA having passed through the intake opening 10 obliquely downward is substantially changed upward to be directed toward the above bug filters 8. This also facilitates dispersion of the precoat agent P mixed with the exhaust air EA in the exhaust air EA.

A jet opening 11a of the precoat agent nozzle 11 is arranged in a downstream position relative to the central position of the accumulation recess 12 in the direction of passage of the exhaust air EA in the intake opening 10 to be directed substantially vertically and upwardly. On the other hand, a slanting surface 12c is formed in the inner depth surface of the accumulation recess 12 to be substantially parallel to the slanting bottom 13 for receiving the sprayed precoat agent P and compressed air. A jet central axis of the precoat agent nozzle 11 is configured to obliquely intersect the slanting surface 12c.

More particularly, this arrangement of the nozzle crossing the slanting surface prevents the precoat agent P having ejected from the precoat agent nozzle 11 from being attached to and accumulated on the inner depth surface of the accumulation recess 12.

In addition, the above-mentioned whirl-like accumulation is formed mainly in an upstream portion in the accumulation recess 12 to localize the area where the precoat agent P is mixed with the exhaust air EA passing through the intake opening 10 in the upstream side of the accumulation recess 12, thereby to secure the time for dispersion after mixture.

A belt conveyor 14 acting as a carrying-out device is provided in a position lower than the downstream opening 10b of the intake opening 10 under the bug filters 8 in the device casing 9 of the filter device 5. The belt conveyor 14 extends through the plurality of filter devices 5 arranged in the longitudinal direction of the booth.

More particularly, the belt conveyor 14 is configured to receive captured accumulated matters (that is, the mixture of the paint mist and the precoat agent P) released and fallen from the catching surfaces of the bug filters 8 or fallen matters produced by the precoat agent P bound with the paint mist on the way to the bug filters 8, and transport them in the longitudinal direction of the booth and discharge them from each filter device 5.

Numeral 19 in the drawings denotes a collecting hopper for receiving the matter to be discharged by the belt conveyor 14. The matter to be discharged received in the collecting hopper is directed to a predetermined collecting section by an air conveying system, for example.

Releasing members 15 are provided in the vicinity of an area above the bug filters 8 in the device casing 9 of each filter device 5 for ejecting the compressed air pulsewise.

More particularly, when the accumulated layer of the captured matter containing the mixture of the paint mist and the precoat agent P formed on the catching surface of the bug filter (8) grows to some extent, the compressed air is pulsewise applied to each of the bug filters 8 by the releasing members 15 from the downstream side of the direction of air passage, thereby to forcibly release the accumulated layer of the captured matter from the catching surface of the bug filter 8 and cause it to fall on the belt conveyor 14.

Additionally, a raising prevention guide plate 16 is provided to continue from a downstream edge of the slanting bottom 13 in the intake opening 10 to horizontally project toward a region above the belt conveyor 14.

More specifically, the exhaust air EA having passed through the intake opening 10 is directed to the bug filters 8 under the guidance of the raising prevention guide plate 16, thereby to prevent lightweight powder components of the fallen mixture matte on the belt conveyor 14 from being raised by the exhaust air EA.

[Second Embodiment]

Figure 4:
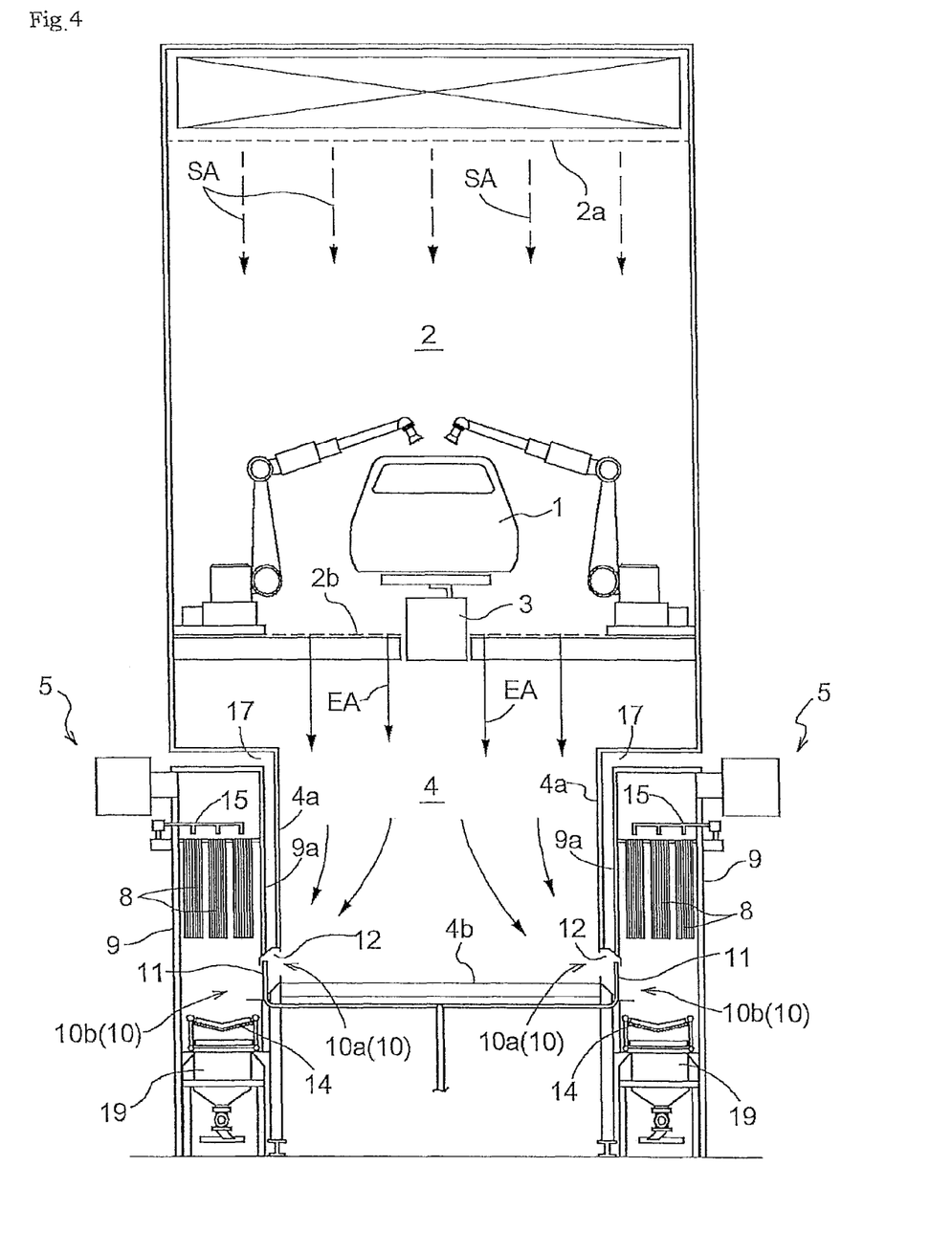
FIG. 4 is a sectional view of a painting booth according to a second embodiment.

FIG. 4 shows a painting booth improved from the painting booth according to the first embodiment, in which the exhaust chamber 4 has a width smaller than the painting chamber 2 with dented portions 17 being formed at opposite lateral sides of the exhaust chamber 4 under the painting booth 2.

The filter devices 5 are arranged in each of the dented portions 17 adjacent to the exhaust chamber 4 in the longitudinal direction of the booth.

In the same manner as the painting booth according to the first embodiment, the slit-like intake openings 10 in each filter device 5 are arranged in line in the longitudinal direction of the booth in the lower end portion of each of the opposite side walls 4a of the exhaust chamber 4 to open toward the exhaust chamber 4 at the bottom portion of the exhaust chamber 4.

The remaining constructions including the arrangement of the precoat agent nozzle 11 in the intake opening 10 of the filter device 5 shown in FIG. 3 are the same as the painting booth according to the first embodiment. According to the second embodiment, while the filter devices 5 are arranged in the longitudinal direction of the booth adjacent to the exhaust chamber 4, an area required for installing the painting booth including the filter devices 5 can be reduced.

[Third Embodiment]

Figure 5:
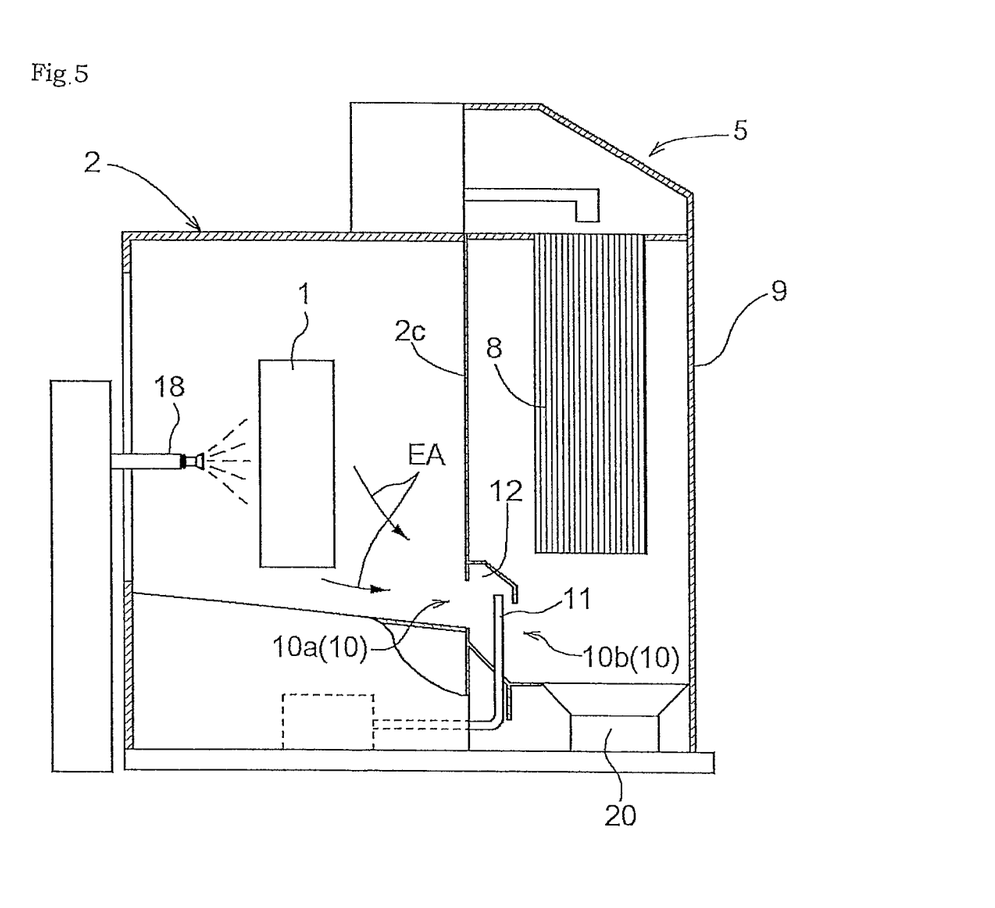
FIG. 5 is a sectional view of a simplified painting booth according to a third embodiment.

FIG. 5 shows a simplified painting booth. The filter device 5 is arranged adjacent to the painting chamber 2, in which a side wall 2c of the side walls of the painting chamber 2 for painting the target object 1 facing a side wall provided with a painting gun 18 across the target object 1 is also used as one of the side walls of the device casing 9 of each filter device 5.

The intake opening 10 of the filter device 5 is formed at a lower end portion of the common side wall 2c as a slit extending in the width direction thereof to open at the bottom of the painting chamber 2.

In the filter device 5, basically in the same manner as the filter device of the first embodiment, the direction of the exhaust air EA drawn into the device casing 9 from the painting chamber 2 through the slit-like intake openings 10 is changed upward to pass through the bug filters 8, thereby to catch the paint mist present in the exhaust air EA by the bug filters 8.

The accumulation recess 12 having substantially the same construction as the recess shown in FIG. 3 is continuously formed in the intake opening 10 of the filter device 5 in the longitudinal direction (width direction) of the intake opening 10 at the upper edge portion thereof. The precoat agent nozzle 11 for ejecting the precoat agent P along with compressed air is arranged to spray the precoat agent P and compressed air on the inner depth surface of the accumulation recess 12 at the longitudinal (width) central portion of each intake opening 10.

More particularly, in such a simplified painting booth as well, the whirl-like accumulation is produced in the accumulation recess 12 in the same manner as the filter device shown in the first embodiment, thereby to disperse the precoat agent P ejected from the precoat agent nozzle 11 in the longitudinal direction of the intake opening 10 and mix the same with the exhaust air EA passing through the intake opening 10.

While the required number of precoat agent nozzles 11 can be reduced in this arrangement, the distribution of the precoat agent P in the exhaust air EA directed to the bug filters 8 is effectively made even in the longitudinal direction of the intake opening 10 (in other words, the width direction of the painting chamber 2).

A collecting container 20 is provided in the bottom of the device casing 9 for receiving and collecting the captured accumulated matters (mixed accumulated matters of the paint mist and the precoat agent P) released and fallen from the catching surfaces of the bug filters 8.

[Other Embodiments]

Other embodiments are described hereinafter.

In order to arrange the filter device 5 adjacent to the exhaust chamber 4 or the painting chamber 2 to form the intake opening 10 for the filter device 5 in the side wall 4a of the exhaust chamber 4 or the side wall 2c of the painting chamber 2, it is possible to employ either the arrangement in which the side wall 9a of the device casing 9 of each filter device 5 is positioned close to the side wall 4a of the exhaust chamber 4 or the side wall 2c of the painting chamber 2, or the arrangement in which the side wall 4a of the exhaust chamber 4 or the side wall 2c of the painting chamber 2 is also used as the side wall 9a of the device casing 9 of each filter device 5.

Figure 6:
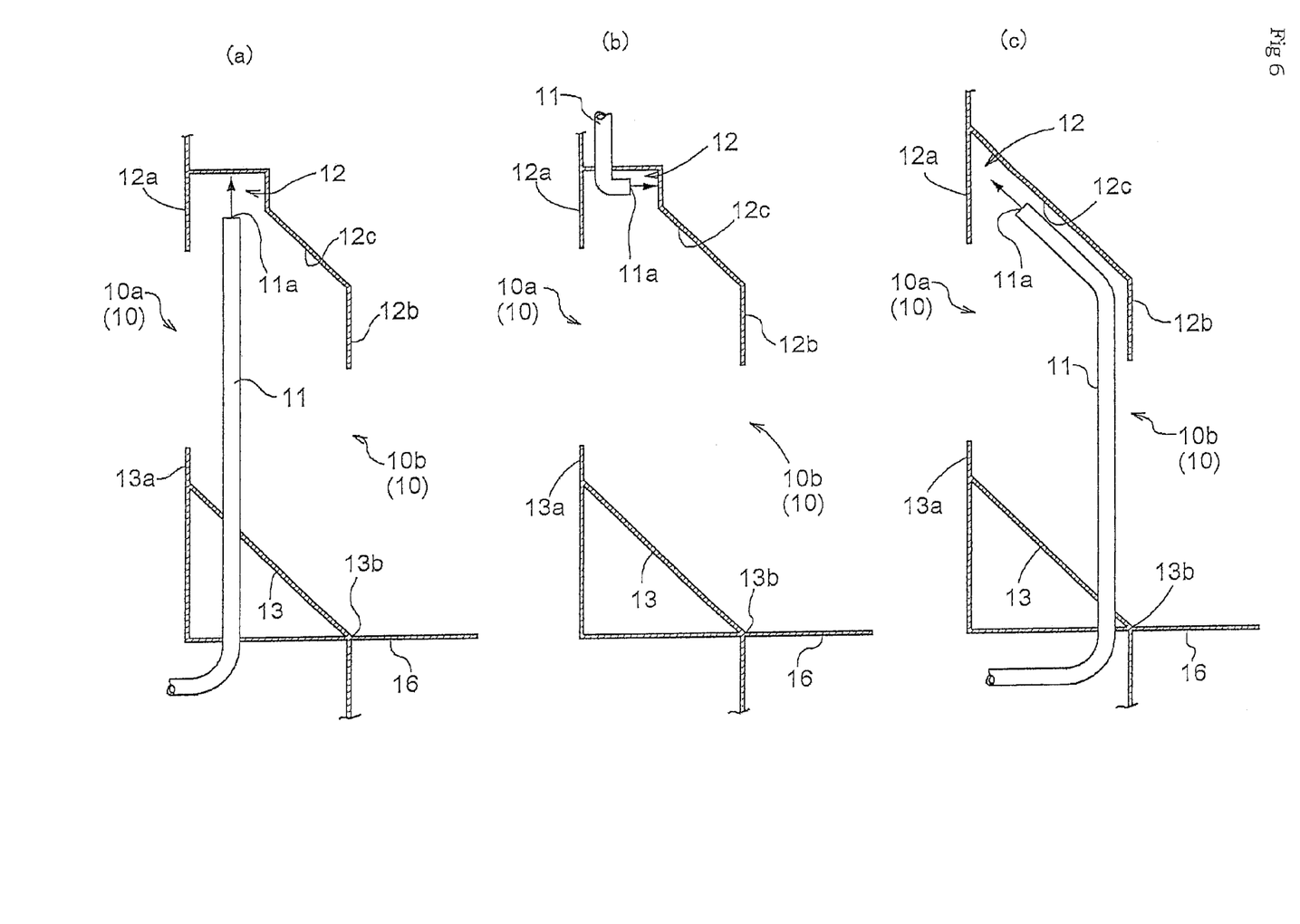
FIG. 6 is an enlarged view of a principal portion according to a modified embodiment.

With respect to the accumulation recess 12 provided in the upper edge portion of the slit-like intake opening 10 of the filter device 5, a specific profile as viewed from the longitudinal direction of the intake opening 10 may vary to have any kind of polygonal shapes or an arc shape, for example. Alternatively, a further recess may be provided in the depth portion of the accumulation recess 12 as shown in FIGS. 6(a) and 6(b), or the entire inner surface of the accumulation recess 12 may be formed as a slanting surface inclined downward toward the downstream side as shown in FIG. 6(c).

Further, the precoat agent nozzle 11 for ejecting the precoat agent P along with the carrier gas toward the inner depth surface of the accumulation recess 12 may have its jet central axis obliquely or perpendicularly intersecting the inner surface of the accumulation recess 12. The precoat agent nozzle 11 may be arranged as shown in FIGS. 6(a) to 6(c).

The profile and construction of the slit-like intake opening 10 extending in the width direction as viewed from the longitudinal direction thereof are not limited to those of the above-noted embodiments, but may vary in relation to the accumulation recess 12 provided at the upper edge portion.

It is possible to arrange the upstream opening 10a and the downstream opening 10b at the same level or arrange the downstream opening 10b at a lower level than the upstream opening 10a. Further, the lower edge portion of the intake opening 10 may dispense with the bottom wall to be a cut edge of a simple vertical plate.

Various powder-type matters are usable as the precoat agent P depending on the viscous matter to be captured, including calcium carbonate powder, caustic soda powder, hydrated lime powder, calcium hydrate powder, calcium silicate powder, zeolite powder, rock dust, aluminum oxide powder, silicon oxide powder, or powder paint.

Among others, it is preferable to use an agent capable of binding with the matter to be captured such as paint mist to reduce viscosity of the matter to be captured, or having a deodorizing effect or sterilizing effect.

The target gas containing the matter to be captured is not limited to air, but may be any type of gas.

The filter 8 housed in the device casing 9 is not limited to the bug filter, but may be one of various types of filters such as a pleated filter, plate-like filter or box-like filter depending on the matter to be captured or the precoat agent P.

In implementing the filter device according to the present invention, the painting booth or the simplified painting booth using such a filter device, an operation system may be employed for forming the accumulated layer of the ejected precoat agent P only on the catching surface of the filter 8 in advance prior to catching the matter to be captured.

In catching operation for the matter to be captured, the operation system is not limited to the system for ejecting the precoat agent P continuously but may be a system for ejecting the precoat agent P intermittently.

The filter device according to the present invention may be used to capture any viscous matter in various fields other than the paint mist.

The painting booth and simplified painting booth according to the present invention may be used to paint various objects including an automobile body, automobile parts, a casing for electric appliances, any kinds of steel material, etc.

Industrial Usability

The present invention is typically applicable to any painting equipment, and also in various any other fields in which it is required to catch a viscous matter.

The invention claimed is:

1. A filter device for a painting booth comprising:
   a device casing configured to be in communication with the painting booth;
   a filter housed in the device casing;
   an intake opening provided in the device casing for taking in an exhaust gas from the painting booth containing a viscous matter to be captured; and
   a precoat agent nozzle provided in the intake opening for ejecting a powder precoat agent for the filter along with carrier gas toward the exhaust gas that flows into the device casing from the intake opening,
   wherein the intake opening is a slit or rectangular opening extending in a width direction and provided in a side face portion of the device casing,
   an accumulation recess provided in an upper edge portion of the intake opening and continuously formed in a longitudinal direction of the intake opening, the accumulation recess having a profile that opens downward as viewed from the longitudinal direction of the intake opening; and
   wherein the precoat agent nozzle is arranged in a predetermined position of the intake opening in the longitudinal direction thereof for ejecting the precoat agent and carrier gas toward an inner depth surface of the accumulation recess.

2. The filter device as claimed in claim 1, wherein the accumulation recess defines an upstream edge portion in a direction of passage of the exhaust gas as a vertical upstream suspended wall.

3. The filter device as claimed in claim 1, wherein the accumulation recess defines a downstream edge portion in a direction of passage of the exhaust gas as a vertical downstream suspended wall.

4. The filter device as claimed in claim 1, wherein the precoat agent nozzle has a jet central axis that obliquely intersects the inner depth surface of the accumulation recess.

5. The filter device as claimed in claim 1, wherein the precoat agent nozzle has a jet opening positioned in the downstream side in reference to the central portion of the accumulation recess in the direction of passage of the exhaust gas in the intake opening.

6. The filter device as claimed in claim 1, wherein a slanting bottom is formed at a lower edge portion of the intake opening to oppose to the accumulation recess formed at the upper edge portion and descend toward the downstream side in the direction of passage of the exhaust gas in the intake opening, the slanting bottom being continuously formed in the longitudinal direction of the intake opening.

7. The filter device as claimed in claim 6, wherein the downstream edge portion of the accumulation recess is arranged in a position lower than the upstream edge portion in the direction of passage of the exhaust gas to allow a downstream opening formed between the downstream edge portion of the accumulation recess and an underlying downstream edge portion of the slanting bottom to be arranged in a position lower than an upstream opening formed between the upstream edge portion of the accumulation recess and the underlying upstream edge portion of the slanting bottom, and wherein the filter is arranged in a position higher than the downstream opening in the interior of the device casing.

8. The filter device as claimed in claim 6, wherein the slanting bottom has an upstream edge portion acting as a vertical upstream upright wall extending upright toward the upstream edge portion of the accumulation recess in the direction of passage of the exhaust gas in the intake opening.

9. The filter device as claimed in claim 1, wherein the filter is arranged in a position higher than the intake opening in the interior of the device casing, and wherein a carrying-out device is provided in a position lower than the intake opening under the filter for transporting a mixture released and fallen from the filter in the longitudinal direction of the intake opening and discharging them to the outside of the device casing.

10. The filter device as claimed in claim 9, wherein a raising prevention guide plate is provided to horizontally project from a lower edge portion of the intake opening toward the carryout device.

11. A painting booth using the filter device as claimed in claim 1, the painting booth comprising an exhaust chamber provided under a painting chamber for painting a target object, the exhaust chamber being configured to receive exhaust air containing paint mist discharged downward from the painting chamber,     wherein a plurality of the filter devices are arranged in a longitudinal direction of the booth with the intake openings of each of the filter devices being arranged in line in the longitudinal direction of the booth and open toward the interior of the exhaust chamber.

12. The painting booth as claimed in claim 11, wherein the intake openings are arranged in line in the longitudinal direction of the booth at a bottom portion of the exhaust chamber.

13. The painting booth as claimed in claim 11, wherein the filter devices are arranged in the longitudinal direction of the booth adjacent to the exhaust chamber, and the intake opening of each of the filter devices is formed in a side wall of the exhaust chamber.

14. A simplified painting booth using the filter device as claimed in claim 1, wherein the filter device is arranged adjacent to the painting chamber for spraying a target object, and the intake opening of the filter device is formed in a side wall of the painting chamber at a bottom portion of the painting chamber.

\* \* \* \* \*